(12) United States Patent
Ito

(10) Patent No.: US 8,488,434 B2
(45) Date of Patent: Jul. 16, 2013

(54) OBJECTIVE LENS, OPTICAL PICKUP APPARATUS USING THE SAME, AND METHOD FOR MANUFACTURING OBJECTIVE LENS

(75) Inventor: Mitsuru Ito, Zama (JP)

(73) Assignees: Sanyo Electric Co., Ltd, Moriguchi-shi (JP); Sanyo Optec Design Co., Ltd, Tokyo (JP)

( * ) Notice: Subject to any disclaimer, the term of this patent is extended or adjusted under 35 U.S.C. 154(b) by 0 days.

(21) Appl. No.: 13/360,003

(22) Filed: Jan. 27, 2012

(65) Prior Publication Data

US 2012/0195181 A1    Aug. 2, 2012

(30) Foreign Application Priority Data

Jan. 31, 2011    (JP) .................. 2011-017835

(51) Int. Cl.
*G11B 7/135* (2012.01)

(52) U.S. Cl.
USPC .............. 369/112.23; 369/44.23; 369/112.12; 359/558; 359/565; 359/569

(58) Field of Classification Search
USPC ............. 369/44.23, 112.12, 112.23; 359/558, 359/565, 569
See application file for complete search history.

(56) References Cited

U.S. PATENT DOCUMENTS

| | | | | |
|---|---|---|---|---|
| 2006/0092815 A1* | 5/2006 | Kimura et al. | ........... | 369/112.08 |
| 2008/0181085 A1* | 7/2008 | Kimura et al. | ........... | 369/112.23 |
| 2010/0284261 A1* | 11/2010 | Nakamura | ............... | 369/112.23 |
| 2010/0284262 A1* | 11/2010 | Nakamura et al. | ........ | 369/112.23 |
| 2010/0322059 A1* | 12/2010 | Yasui | ........................ | 369/112.03 |
| 2011/0007622 A1* | 1/2011 | Mimori | ..................... | 369/112.23 |
| 2011/0085433 A1* | 4/2011 | Takada et al. | ............ | 369/112.23 |
| 2011/0122755 A1* | 5/2011 | Tateyama et al. | ......... | 369/112.23 |

FOREIGN PATENT DOCUMENTS

| | | | |
|---|---|---|---|
| JP | 2007-196665 | | 8/2007 |
| JP | 2007196665 A | * | 8/2007 |

* cited by examiner

*Primary Examiner* — Wayne Young
*Assistant Examiner* — Brenda Bernardi
(74) *Attorney, Agent, or Firm* — Morrison & Forester LLP

(57) ABSTRACT

Provided is an objective lens manufactured well by using a mold and an optical pickup apparatus including the same. The objective lens of the present invention includes a first region that focuses laser beams of a BD, DVD, and CD standards, a second region that focuses the laser beams of the DVD and CD standards, and a third region that focuses the laser beams of the BD and the DVD standards are provided in this order from a center portion of the objective lens. A first annular zone step provided in the first region has a step amount larger than step amounts of annular zone steps provided in other regions.

13 Claims, 10 Drawing Sheets

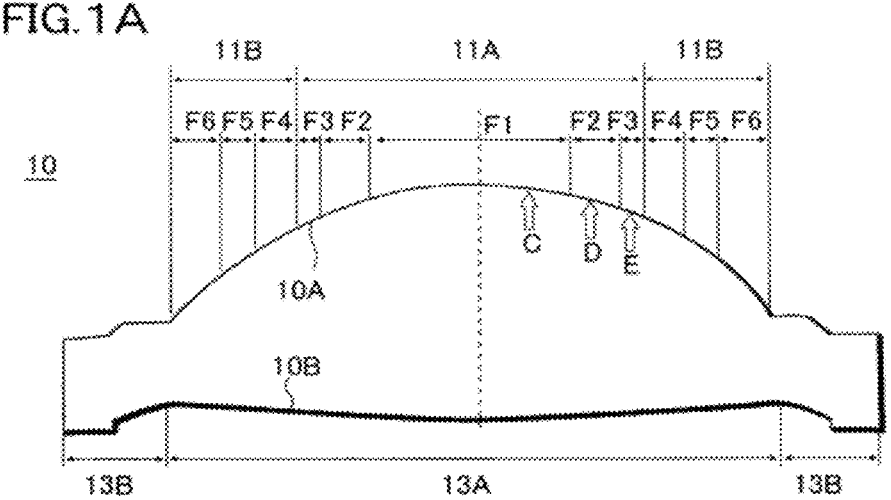

FIG.4A

| SURFACE | CURVATURE RADIUS R(mm) | SURFACE INTERVAL d(mm) | REFRACTIVE INDEX n |
|---|---|---|---|
| (OBJECT DISTANCE) | - | ∞ | - |
| (STOP) | ∞ | 0 | - |
| (OPTICAL PICKUP LENS:SURFACE R1) | R1 | d1 | n1 |
| (OPTICAL PICKUP LENS:SURFACE R2) | R2 | d2 | - |
| (OPTICAL TRANSPARENT LAYER IN OPTICAL DISC) | ∞ | d3 | n2 |
| (OPTICAL TRANSPARENT LAYER IN OPTICAL DISC) | ∞ | 0 | - |

FIG.4B

| USED λ (nm) | OPENING SIZE Φ (mm) | REFRACTIVE INDEX OF LENS n1 | REFRACTIVE INDEX OF OPTICAL TRANSPARENT LAYER IN OPTICAL DISC n2 | SURFACE INTERVAL d2 (mm) | SURFACE INTERVAL d3 (mm) |
|---|---|---|---|---|---|
| 405 | 1.92 | 1.558701 | 1.620659 | 0.598235121E | 0.0875 |
| 660 | 1.48 | 1.539842 | 1.578559 | 0.731854819 | 0.6 |
| 785 | 1.83 | 1.536398 | 1.573388 | 0.347388732 | 1.2 |

FIG.4C

TEMPERATURE CHARACTERISTICS OF MATERIAL : Δn/ΔT (1/°C)

| WAVELENGTH | 405 | 660 | 785 |
|---|---|---|---|
| LENS MATERIAL | -1.2E-04 | -1.2E-04 | -1.2E-04 |
| OPTICAL TRANSPARENT LAYER IN DISC | -1.0E-04 | -1.0E-04 | -1.0E-04 |

FIG.4D

TEMPERATURE CHARACTERISTICS OF MATERIAL : Δn/Δλ (1/nm)

| WAVELENGTH | 405 | 660 | 785 |
|---|---|---|---|
| LENS MATERIAL | -1.4E-04 | -3.7E-05 | -3.9E-05 |
| OPTICAL TRANSPARENT LAYER IN DISC | -4.1E-04 | -3.3E-05 | -3.9E-05 |

FIG.4E

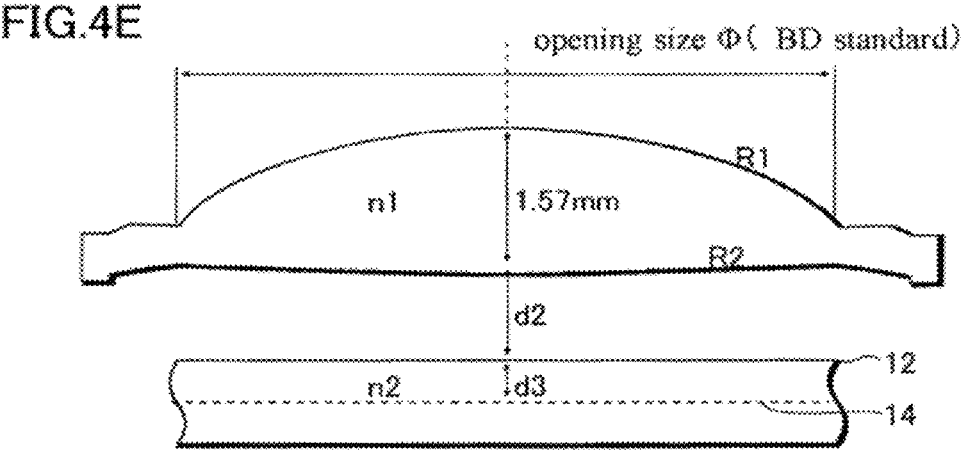

| OPTICAL PICKUP LENS SURFACE R2 | |
|---|---|
| R2 | -4.840469033 |
| K2 | 4.392271922 |
| A2,4 | 0.146397294 |
| A2,6 | -0.211218998 |
| A2,8 | 0.275635144 |
| A2,10 | -0.226145786 |
| A2,12 | 0.109364781 |
| A2,14 | -0.029228194 |
| A2,16 | 0.003330828 |

FIG.7A

| DEGREE m(DVD) | 1 | 2 | 3 | 4 | 5 |
|---|---|---|---|---|---|
| STEP AMOUNT ON AXIS ($\mu$m) | 0.724896 | 1.449792 | 2.174687 | 2.899583 | 3.624479 |
| RESIDUAL ABERRATION (DVD) | 0 | 0 | 0 | 0 | 0 |
| RESIDUAL ABERRATION (CD) | -0.4073 | 0.185407 | -0.22189 | 0.370813 | -0.03848 |
| RESIDUAL ABERRATION (BD) | 0.495197 | -0.00961 | 0.485591 | -0.01921 | 0.475985 |

| DEGREE m(DVD) | 6 | 7 | 8 | 9 | 10 |
|---|---|---|---|---|---|
| STEP AMOUNT ON AXIS ($\mu$m) | 4.349375 | 5.0742705 | 5.79918628 | 6.524062 | 7.248958 |
| RESIDUAL ABERRATION (DVD) | 0 | 0 | 0 | 0 | 0 |
| RESIDUAL ABERRATION (CD) | -0.44378 | 0.14892345 | -0.2583732 | 0.33433 | -0.07297 |
| RESIDUAL ABERRATION (BD) | -0.02882 | 0.48637982 | -0.0384233 | 0.456774 | -0.04603 |

FIG.7B

| DEGREE m(DVD) | 1 | 2 | 3 | 4 | 5 | 6 |
|---|---|---|---|---|---|---|
| STEP AMOUNT ON AXIS ($\mu$m) | 1.223033 | 2.446066 | 3.669099 | 4.892132 | 6.115165 | 7.338198 |
| RESIDUAL ABERRATION (DVD) | 0 | 0 | 0 | 0 | 0 | 0 |
| RESIDUAL ABERRATION (CD) | -0.19451 | -0.38902 | -0.49353 | 0.341956 | 0.177448 | 0.012934 |
| RESIDUAL ABERRATION (BD) | -0.31282 | 0.374369 | 0.061554 | -0.25126 | 0.433923 | 0.123108 |

OBJECTIVE LENS, OPTICAL PICKUP APPARATUS USING THE SAME, AND METHOD FOR MANUFACTURING OBJECTIVE LENS

This application claims priority from Japanese Patent Application Number JP 2011-017835 filed on Jan. 31, 2011, the content of which is incorporated herein by reference in its entirety.

BACKGROUND OF THE INVENTION

1. Field of the Invention

The present invention relates to an objective lens with improved moldability and an optical pickup apparatus using the same. The present invention also relates to a method for manufacturing such an objective lens.

2. Description of the Related Art

An objective lens formed by molding a glass or plastic material into a predetermined shape with a mold has been conventionally used for reading and writing of information from and to an optical disc.

In a method for manufacturing an objective lens formed of a plastic material disclosed in Japanese Patent Application Publication 2007-196665, with reference to FIG. 2, a description thereof, and other part, a mold including mold portions 11 and 12 is prepared and a resin material is injected into the mold to form the objective lens having a predetermined shape. The mold portions 11 and 12 have inner wall shapes conforming to lens surface shapes of the objective lens to be molded.

To reduce the number of parts required in an optical pickup apparatus, a compatible lens has been developed that focuses laser beams of a plurality of standards on corresponding optical discs. For example, a compatible objective lens has been developed that focuses laser beams of a blu-ray disc (BD) standard, a digital versatile disc (DVD) standard, and a compact disc (CD) standard on optical discs of corresponding standards.

SUMMARY OF THE INVENTION

However, there has been a problem that injection molding is difficult in the method of manufacturing an objective lens by using the mold described above.

Specifically, an annular zone step is provided in a lens surface of the compatible objective lens to correct a spherical aberration occurring in accordance with a thickness of a covering layer that covers an information recording layer of an optical disc. Thus, to mold the compatible objective lens including such an annular zone step by injection molding, a step portion conforming to a shape of the annular zone step of the objective lens needs to be provided in an inner wall of the mold. Forming a step portion with a large step amount in the inner wall of the mold causes the following problem. Cure shrinkage produced at the time of curing the resin material in the mold makes the annular zone step of the objective lens molded by the injection molding and the step portion of the mold excessively fitted to one another. As a result, the objective lens is difficult to separate from the mold. Furthermore, if the degree of the cure shrinkage is large, the annular zone step of the objective lens fitted to the step portion of the mold may be deformed or damaged, and which in turn degrades the optical characteristics of the objective lens.

Moreover, in a transportation step or a mounting step of the objective lens, an impact and the like is more likely to act on an annular zone step arranged in the objective lens on an outer side than on an annular zone step arranged on an inner side. Thus, when the annular zone step having a large step amount is arranged in the objective lens on the outer side, the annular zone step is more largely deformed when external force such as an impact acts on the objective lens, and thus the characteristics of the objective lens may be largely degraded.

The present invention is made in view of the above problems. An object of the present invention is to provide an objective lens that can be manufactured well with a mold and an optical pickup apparatus including the objective lens. Another object of the present invention is to provide a method for manufacturing such an objective lens.

The present invention is an objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising: a first shared region that is a region arranged in a center portion of the objective lens and configured to focus plural ones of the first laser beam, the second laser beam, and the third laser beam on the information recording layers of the corresponding optical discs, the first shared region being provided with a first annular zone step; and a second shared region that is a region arranged outside the first shared region and configured to focus plural ones of the first laser beam, the second laser beam, and the third laser beam on the information recording layers of the corresponding optical discs, the second shared region being provided with a second annular zone step, wherein a step amount of the first annular zone step provided in the first shared region is larger than a step amount of the second annular zone step provided in the second shared region.

An optical pickup apparatus of the present invention includes the objective lens having such a structure.

The present invention is a method for manufacturing an objective lens including a first lens surface and a second lens surface opposite to each other, and including a plurality of annular zone steps provided in the first lens surface, the method comprising: bringing a first mold including an inner wall having a shape conforming to the first lens surface and a second mold including an inner wall having a shape conforming to the second lens surface into contact with each other to form a cavity and curing a material of the objective lens in the cavity; and separating the first mold and the second mold from each other and taking out the objective lens, wherein the inner wall of the first mold includes a plurality of step portions respectively corresponding to the plurality of annular zone steps provided in the first lens surface of the objective lens, and of the plurality of step portions, one arranged on an inner side in the inner wall of the first mold has a step amount larger than a step amount of one provided on an outer side in the inner wall of the first mold.

BRIEF DESCRIPTION OF THE DRAWINGS

FIG. 1 are diagrams of an objective lens according to a preferred embodiment of the present invention, in which FIG. 1A is a cross-sectional view of the objective lens, FIG. 1B shows tables for describing regions provided in the objective lens, and FIGS. 1C to 1E are cross-sectional views of annular zone steps.

FIG. 2 are diagrams of another preferred embodiment of the objective lens according to the present invention, in which

FIG. 3 are diagrams showing how the objective lens of the preferred embodiment focuses a laser beam.

FIGS. 4A to 4D are tables showing parameters used in determining the characteristics and shape of the objective lens of the preferred embodiment, and FIG. 4E is a diagram for describing the parameters shown in FIG. 4A and the like.

FIG. 5 are tables showing parameters used in determining the shape of the objective lens of the preferred embodiment. FIG. 5A shows parameters defining the shape of a lens surface on which an annular zone is provided. FIG. 5B shows parameters defining a lens surface on which no annular zone is formed.

FIG. 6 are diagrams showing annular zone steps provided in the objective lens according to the preferred embodiment of the present invention, in which

FIG. 7 are tables showing relationships between step amounts of the annular zone step included in the objective lens of the preferred embodiment and residual aberrations.

FIG. 8 are diagrams showing a method for manufacturing the objective lens according to the preferred embodiment of the present invention in which

DESCRIPTION OF THE INVENTION

Figure 2A:
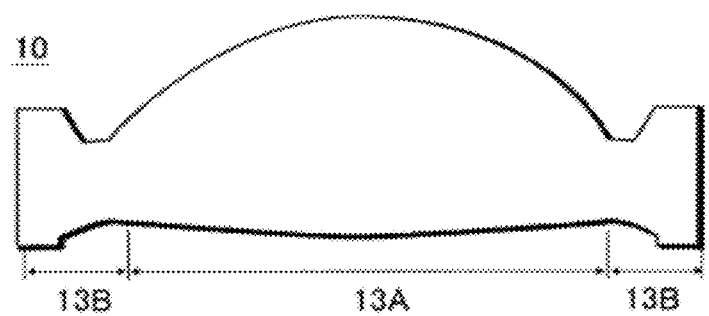
FIG. 2A is a cross-sectional view of the objective lens according to the other embodiment, and FIG. 2 B is a diagram showing a state where the objective lens is mounted in the optical pickup apparatus.

Referring to FIG. 1, an objective lens 10 according to the embodiment will be described. FIG. 1A is a cross-sectional view showing the objective lens 10, and FIG. 1B is a table for describing each region provided in the objective lens 10. FIGS. 1C to 1E are cross-sectional views each showing a shape of an annular zone step.

The objective lens 10 includes a first lens surface 10A and a second lens surface 10B, and a radiated laser beam passes through the objective lens 10 from the first lens surface 10A to the second lens surface 10B during operation.

A resin or glass material is used as a material for the objective lens 10. The resin material is polyolefin resin (cyclic olefin copolymer or cycloolefin polymer). The resin material may also be PMMA resin (acrylic resin), PC resin (polycarbonate), or the like.

The objective lens 10 focuses a plurality of laser beams having different wavelengths on information recording layers of optical discs. Specifically, the objective lens 10 focuses laser beams of a BD standard, a DVD standard, and a CD standard on information layers of optical discs of corresponding standards.

Here, the wavelength of a laser beam of the BD standard is within the blue-violet (blue) wavelength range of 395 nm to 420 nm (405 nm, for example), and the wavelength of a laser beam of the DVD standard is within the red wavelength range of 645 nm to 675 nm (655 nm, for example). In addition, the wavelength of a laser beam of the CD standard is within the infrared wavelength range of 765 nm to 805 nm (785 nm, for example). The laser beam incident on the objective lens 10 in this embodiment is infinite light or weak finite light. The infinite light is applied to an optical disc of each standard that includes a single information recording layer. The weak finite light is used in an optical disc of the BD standard or the DVD standard, which includes multiple information recording layers.

With reference to FIG. 1A, the objective lens 10 includes an aspherical portion 13A and a flange portion 13B on a periphery of the aspherical portion 13A. The aspherical portion 13A contributes to the focusing of an incident laser beam and includes a first lens surface 10A and a second lens surface 10B.

The flange portion 13B surrounds the aspherical portion 13A. When the objective lens 10 is attached to a lens holder of an optical pickup apparatus, the flange portion 13B on which an adhesive is applied is fixed to the lens holder. The objective lens 10 having such a shape is formed by injection molding using a mold. This will be described later with reference to FIG. 8. An upper peripheral portion of the flange 13B has a step shape in which an outer side is descended. Thus, an upper surface of the flange portion 13B can be easily separated from the mold when the objective lens is molded by the injection molding described later with reference to FIG. 8.

The first lens surface 10A of the objective lens 10 includes a shared region 11A provided in its center portion and an annular zone shaped specialized region 11B surrounding the shared region 11A. The shared region 11A focuses any two or all of laser beams of the BD standard, the DVD standard, and the CD standard on the information recording layers of the corresponding optical discs. The shared region 11A includes a first region F1, a second region F2, and a third region F3 described below. The specialized region 11B focuses the laser beam of the BD standard or the DVD standard on the information recording layer of the corresponding optical disc. The specialized region 11B includes a fourth region F4, a fifth region F5, and a sixth region F6 described below.

The first region F1 is a circular region formed in a center portion of the first lens surface 10A of the objective lens 10 and focuses the laser beams of the BD, the DVD, and the CD standards on the information recording layers of the corresponding optical discs. The first region F1 is formed in the circular shape in a region from the center of the objective lens 10 to 0.5928 mm in radius, and thus is formed into an annular zone partitioned by an annular zone step. Here, an annular zone step having a positive step amount is formed. In the embodiment, an annular zone step amount in the traveling direction of the laser beam incident on the objective lens 10 is denoted as a positive amount. Thus, when an annular zone step having a positive step amount is provided, a portion of the objective lens 10 outside the step is smaller in thickness.

A step amount D of the annular zone formed in the first region F1 is calculated by using Formula 1 below.

$$D = m \cdot \lambda / (n-1) \qquad \text{Formula 1:}$$

Here, m is a constant, and n is a refractive index of the objective lens while $\lambda$ is a wavelength of the laser beam. Note that, the detailed values used in designing of the actual objective lens 10 will be described later with reference to FIG. 4 and FIG. 5.

The wavelength (405 nm) of the laser beam of the BD standard is used as the wavelength $\lambda$ used in calculation of the step amount D of the annular zone step formed in the first region F1. Thus, the presence or absence of a step has no influence on the practical wavefront aberration with the laser beam of the BD standard. Meanwhile, a phase shifting on the laser beam of the DVD standard due to the provision of an annular zone step is not an integral multiple of the wavelength. Accordingly, a chromatic aberration occurs in the laser beam of the DVD standard because of the provision of the annular zone step on the first region F1, and a spherical aberration caused by a coating layer of an optical disc is corrected by the chromatic aberration. Thus, the practical aberration occurring in the laser beam of the DVD standard is reduced in the embodiment.

With reference to FIG. 1C, a step amount E1 of a first annular zone step 51A provided in the first region F1 is larger than those of annular zone steps provided in other shared regions (second region F2 and third region F3). As an example, the step amount E1 of the first annular zone step 51A provided in the first region F1 shown in FIG. 1C is about 0.0060 mm, a step amount E2 of a second annular zone step 51B provided in the second region F2 shown in FIG. 1D is about 0.0014 mm, and a step amount E3 of a third annular zone step 51C provided in the third region F3 shown in FIG. 1E is about 0.0026 mm. By thus providing near the center the annular zone step having the largest step amount among the annular zone steps provided for correcting the spherical aberration, the problem in the injection molding described in Description of the Related Art section is solved. This will be described later with reference to FIG. 8.

With reference to FIG. 1C, the first annular zone step 51A has a cross-sectional shape in which the thickness of a portion of the objective lens outside the annular zone step is smaller than that inside the annular zone step. In other words, the objective lens 10 has a so-called "sloping shoulder shape" near the first annular zone step 51A, and thus does not sharply protrude toward the outer side. This also contributes to solving the problem described in Description of the Related Art.

The second region F2 is an annular zone-shaped region (R=0.5928 mm to 0.932 mm) being adjacent to the first region F1 and surrounding the periphery thereof, and forms a spot by focusing each of the laser beams of the DVD standard and the CD standard on an information recording layer of a corresponding optical disc. Here, the point where the laser beams of the DVD standard and the CD standard are focused in the second region F2 is the same as the point where these laser beams are focused in the first region F1. To put it differently, the working distances of the respective regions coincide with each other. The same applies to the regions described below. Note that, the laser beam of the BD standard made incident on this region make no contribution to the spot formation.

Multiple annular zones are provided in the second region F2 and the step amount of an annular zone step provided between adjacent annular zones is calculated from the wavelength of the laser beam of the DVD standard. Thus, the chromatic aberration occurs to correct the spherical aberration occurring in the laser beam of the CD standard. The presence or absence of the annular zone step basically has no influence on the aberration occurring in the laser beam of the DVD standard. In this embodiment, the optical super resolution is achieved by preventing a portion of the laser beam of the BD standard that transmits through the second region F2 from contributing to the spot formation. This will be described later with reference to FIG. 3A.

With reference to FIG. 1D, the second region F2 is provided with the second annular zone step 51B having a negative step amount. Thus, the second region F2 has a cross-sectional shape with which a portion of the objective lens outside the annular zone step is thicker. The step amount of the second annular zone step 51B is set to be negative to correct the spherical aberration occurring in the laser beam of the CD standard with the chromatic aberration.

In the embodiment, an annular zone step is provided between the first region F1 and the second region F2. This is because the position of an outermost circumference portion of the first region F1 where aberrations are optimized with the laser beams of the BD standard and the DVD standard does not coincide with the position of an innermost circumference portion of the second region F2 where aberrations are optimized with the laser beams of the DVD standard and the CD standard. Such an annular zone step is also formed between other adjacent regions. The annular zone steps provided between the adjacent regions are also arranged in such a manner that the annular zone step having the largest step amount is provided near the center. Thus, the injection molding of the objective lens can be performed well The third region F3 is an annular zone-shaped region (R=0.932 mm to 1.013 mm) being adjacent to the second region F2 and surrounding the periphery thereof, and forms a spot by focusing each of the laser beams of the BD standard and the DVD standard on an information recording layer of a corresponding optical disc. Note that, the laser beam of the CD standard incident on the third region F3 makes no contribution to the spot formation. Likewise, the laser beam of the CD standard incident on a region outside the third region F3 makes no contribution to the spot formation either.

Three annular zones are provided in the third region F3 and the step amount of a step formed between adjacent annular zones is calculated from the wavelength of the laser beam of the BD standard as in the case of the first region F1. Accordingly, in this region as well, the spherical aberration of the laser beam of the DVD standard is corrected by the chromatic aberration occurring because of the provision of the annular zone step.

With reference to FIG. 1E, the step amount E3 of the third annular zone step 51C provided in the third region F3 is smaller than that of the first annular zone step 51A provided in the center portion. The third annular zone step 51C has a step amount of a negative value and thus has a shape similar to that of the second annular zone step 51B.

The fourth region F4 is an annular zone-shaped region (R=1.013 mm to 1.08 mm) surrounding the third region F3, and forms a spot by focusing only the laser beam of the BD standard on the information recording layer of the corresponding optical disc. The laser beams of the DVD standard and the CD standard that are radiated on the fourth region F4 make no contribution to the spot formation. Accordingly, the spherical aberrations of the laser beams of the standards other than the BD standard (DVD standard and CD standard) does not have to be taken into consideration, and no annular zone step is thus provided herein. Thus, the fourth region F4 exhibits a continuous surface including no step. The same applies to the fifth region F5 and the sixth region F6 to be described below, where a laser beam of only a specific standard are focused. The fourth region F4 does not have to be configured in consideration of the laser beams of the other standards, and thus the amount of aberration caused thereby can be extremely small. By providing such a region specialized for the BD standard, the aberration occurring in the laser beam of the BD standard caused by the objective lens 10 as a whole is improved.

The fifth region F5 is an annular zone-shaped region (R=1.08 mm to 1.200 mm) surrounding the fourth region F4, and forms a spot by focusing only the laser beam of the DVD standard. The laser beams of the BD standard and the CD standard that are radiated on this region make no contribution to the spot formation. The provision of the fifth region F5, which is a region specialized for focusing only the laser beam of the DVD standard, improves the aberration of the laser beam of the DVD standard. The reason for the improvement is the same as in the case of the fourth region F4.

The sixth region F6 is an annular zone-shaped region (R=1.200 mm to 1.510 mm) surrounding the fifth region F5 and is a region used for focusing only the laser beam of the BD standard as in the case of the fourth region F4. The provision of such a region specialized for focusing the laser beam of the BD standard in an outermost circumferential portion of the objective lens 10 further reduces the aberration of the laser beam of the BD standard as a whole.

No annular zone step is provided in the fourth region F4 to the sixth region F6 serving as the specialized regions. Alternatively, one or a plurality of the fourth region F4 to the sixth region F6 may be provided with an annular zone step. In such a case, a step amount of the annular zone step to be provided is smaller than that of the first annular zone step 51A.

FIG. 2A is a cross-sectional view of another embodiment of the objective lens 10. While the objective lens 10 shown in the figure has a structure basically same as that shown in FIG. 1, the shape of the flange portion 13B is different. The flange portion 13B has a downwardly protruding shape in the objective lens 10 shown in FIG. 1A. Meanwhile, the flange portion 13B in the objective lens 10 shown in this figure has a shape protruding both downward and upward. Thus, by changing a position of an upper end portion of the flange portion 13B, a distance between an optical disc and the objective lens 10 mounted in the optical pickup device can be advantageously adjusted.

Figure 2B:
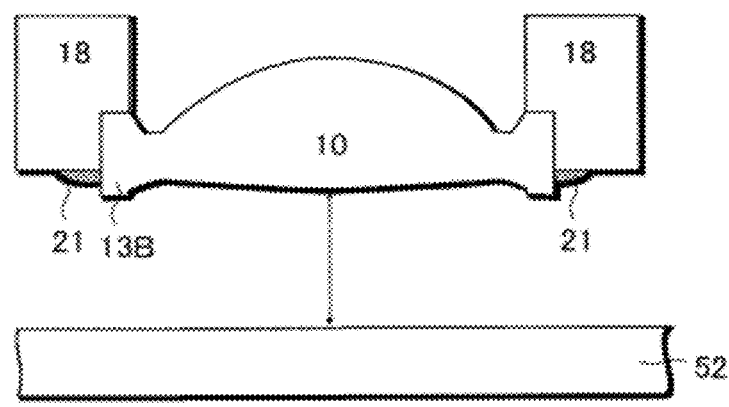

With reference to FIG. 2B, an upper surface of the flange portion 13B of the objective lens 10 is in contact with and fixed to a base 18 of the optical pickup apparatus. Thus, the distance between the objective lens 10 and an optical disc 53 is determined.

An adhesive 21 for fixing the objective lens is applied on a side surface of the flange portion 13B and a lower surface of the base 18. The adhesive 21 may be applied on the upper surface of the flange portion 13B and a mounting surface of the base 18. However, this may make the objective lens inclined. Thus, the objective lens 10 is prevented from inclining by applying the adhesive 21 on the side surface of the flange portion 13B as in this embodiment.

Figure 3A:
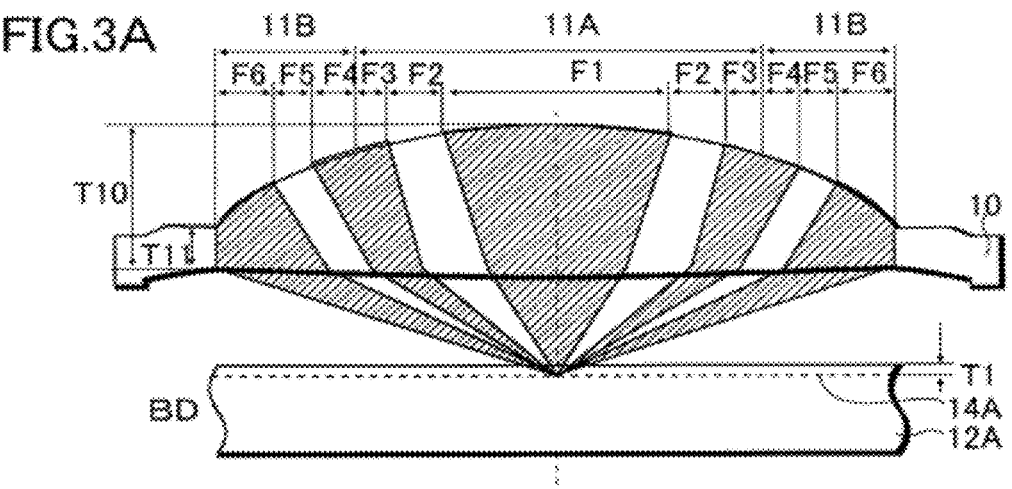
FIG. 3A shows how the laser beam of the BD standard is focused.
Figure 3B:
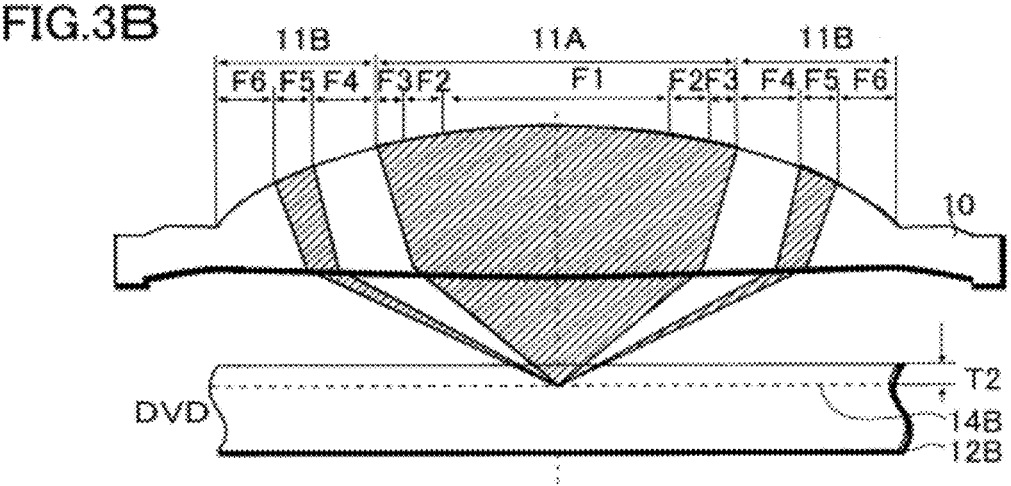
FIG. 3B shows how the laser beam of the DVD standard is focused.
Figure 3C:
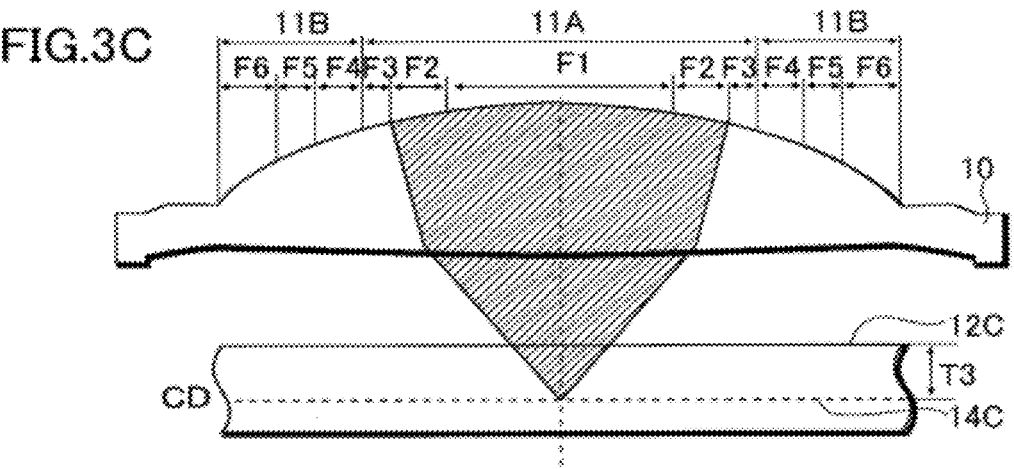
FIG. 3C shows how the laser beam of the CD standard is focused.

Referring to FIG. 3, how the laser beam of each of the standards is focused by the objective lens 10 will be described. Here, FIG. 3A is a cross-sectional view showing how the laser beam of the BD standard is focused on an optical disc 12A by the objective lens 10. FIG. 3B is a cross-sectional view showing the same for the DVD standard, and FIG. 3C is a cross-sectional view showing the same for the CD standard. Here, the portions where a laser beam forming a spot passes through are shown by hatching in each of FIG. 3. Meanwhile, no hatching is provided to the regions making no contribution to the spot formation.

Referring to FIG. 3A, the laser beam of the BD standard emitted from above are focused on an information recording layer 14A of the optical disc 12A of the BD standard by the objective lens 10 and thus forms a spot. Here, a thickness T1 of a coating layer that coats the information recording layer 14A of the optical disc 12A is 0.1 mm, for example.

As apparent from this drawing, the laser beam of the BD standard radiated on the objective lens 10 is not entirely focused on the optical disc 12A, and a portion of the laser beam radiated on the objective lens 10 makes no contribution to the spot formation. To put it specifically, portions of the laser beam radiated on the regions F1, F3, F4 and F6 of the objective lens 10 are focused on the information recording layer 14A of the optical disc 12A. Meanwhile, the second region F2 focuses only the laser beams of the DVD standard and the CD standard, so that the laser beam of the BD standard radiated on this region makes no contribution to the spot formation. Likewise, the fifth region F5 focuses only the laser beam of the DVD standard, so that the laser beam of the BD standard radiated on this region makes no contribution to the spot formation. As described above, a part of the laser beam incident on the objective 10 does not contribute to the spot formation, and thus the optical super resolution is achieved. Moreover, a spot diameter similar to that with the NA of a predetermined value (BD=0.85, DVD=0.60) can be obtained with an NA smaller than the predetermined value and thus, a predetermined amount (more than 0.274 mm) of a thickness (T11) is secured at the end portion of the objective lens 10.

Note that, the use efficiency of the laser beam of the BD standard made incident on the objective lens 10 is approximately 40%, for example, and reading of information can be performed well with this use efficiency while writing can be also performed by using a high power laser.

Referring to FIG. 3B, when the laser beam of the DVD standard is radiated on the objective lens 10, portions of the laser beam emitted onto the regions F1, F2, F3 and F5 are focused on an information recording layer 14B of an optical disc 12B and form a spot. Meanwhile, since the fourth region F4 is a region for focusing only the laser beam of the BD standard, the laser beam of the DVD standard radiated on this region makes no contribution to the spot formation. Likewise, the laser beam of the DVD standard radiated on the sixth region F6 for focusing only the laser beam of the BD standard make no contribution to the spot formation. With this configuration, the optical super resolution can be achieved with the laser beam of the DVD standard as well, and the same effect as in the case of the BD standard described above can be obtained.

Note that, the use efficiency of the laser beam of the DVD made incident on the objective lens 10 is approximately 80%, for example, and reading and writing of information can be performed well. In addition, a thickness T2 of a coating layer that coat the information recording layer 14B of the optical disc 12B of the DVD standard is 0.6 mm.

Referring to FIG. 3C, when the laser beam of the CD standard is radiated on the objective lens 10, only portions of the laser beam radiated on the first region F1 and the second region F2 are focused on an information recording layer 14C of an optical disc 12C and form a spot. Meanwhile, the portions of the laser beam made incident on the regions F3, F4, F5 and F6 make no contribution to the spot formation.

Note that, the use efficiency of the laser beam of the CD standard made incident on the objective lens 10 is approximately 90%, for example, and reading and writing of information can be performed without any problem. In addition, a thickness T3 of a coating layer that coats the information recording layer coating layer 14C of the optical disc 12C of the DVD standard is 1.2 mm.

Referring to FIG. 4 and FIG. 5, the specific shape of the objective lens 10 described above will be described. The tables shown in FIG. 4 and FIG. 5 show coefficients indicating the shape and characteristics of the thus realized objective lens 10.

FIG. 4A and FIG. 4B show reflective indices and surface intervals of an optical pickup lens (objective lens) and optical transparent layer (coating layer) in an optical disc with the wave lengths of the BD standard, the DVD standard and the CD standard. Here, an opening size Φ and surface intervals d2 and d3 are as shown in FIG. 4E.

Moreover, FIG. 4C shows the temperature characteristics of a lens material and the transparent layer in the disc with the wavelength of each of the standards. FIG. 4D shows the material wavelength characteristics of the lens material and the transparent layer in the disc.

Figure 5A:
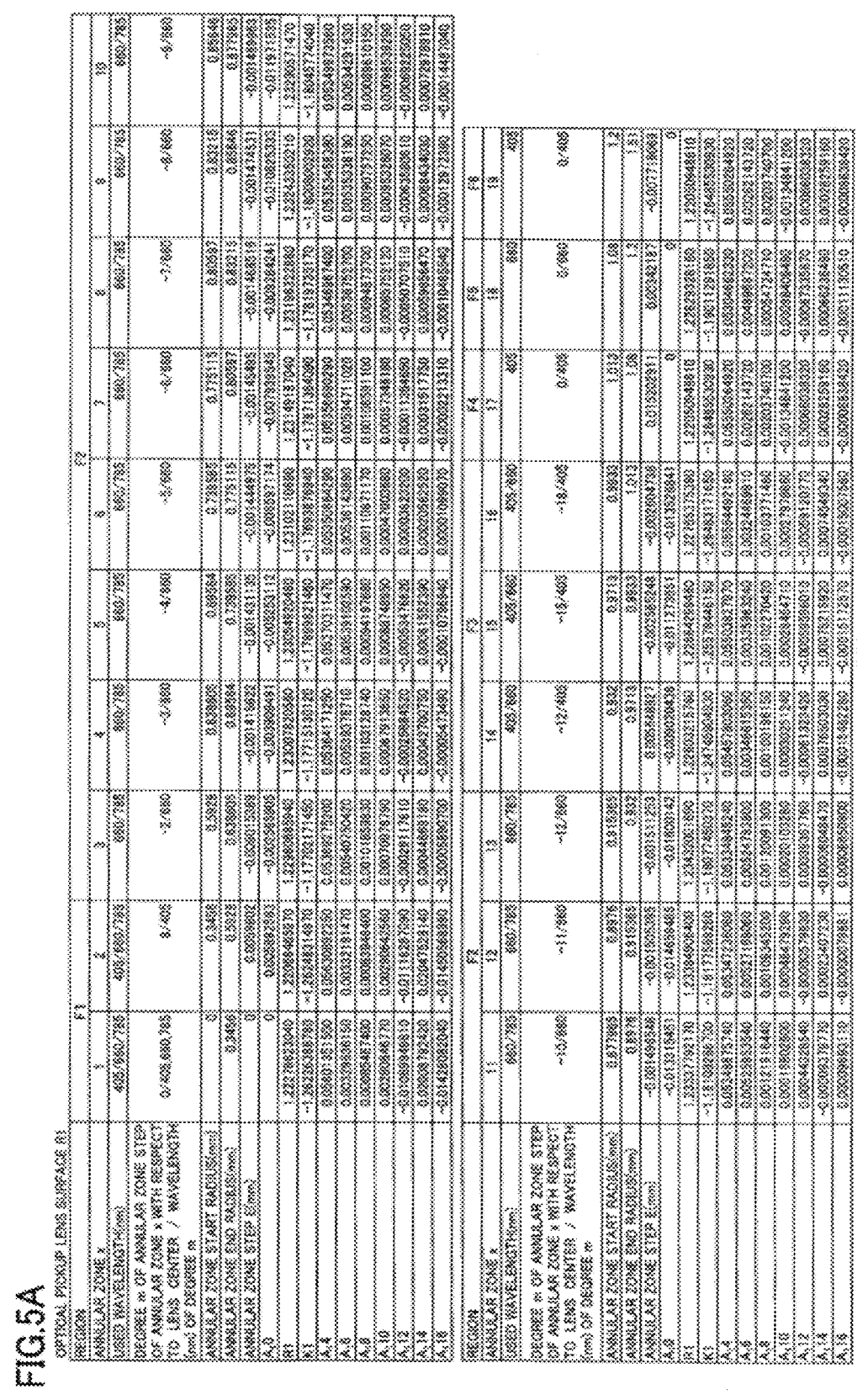

FIG. 5 show parameters defining the shape of the lens surface. FIG. 5A shows parameters defining the shape of a lens surface R1 (the first lens surface 10A shown in FIG. 1A) where multiple annular zones are provided. FIG. 5B shows parameters defining the shape of a lens surface R2 (the second lens surface 10B shown in FIG. 1A) of the objective lens.

Referring to FIG. 5A, the shape of the lens surface is determined by assigning each parameter shown in the table in Formula 2 below.

[Equation 1]

$$Zx = \frac{h1^2}{R1\left[1 + \sqrt{1 - \frac{(1+K1)h1^2}{R1^2}}\right]} + A_1 0 h1^0 +$$

$$A_1 4 h1^4 + A_1 6 h1^6 + A_1 8 h1^8 + A_1 10 h1^{10} + A_1 16 h1^{16} \ldots$$

Formula 2

In Formula 2, the positive signs correspond to the area from the surface R1 to the surface R2 shown in FIG. 4E, h1 is the step amount (mm) from the optical axis, and a numerical value of an annular zone x including h (mm) is used for an aspherical coefficient.

The table shown in FIG. 5A shows a wavelength of a laser beam to be focused, a degree m and a wavelength used in calculation of the annular zone step amount by using Formula 1, and an annular zone start radius, an annular zone end radius, and the coefficients used in calculation of the shape for each annular zone. Here, annular zones 1 and 2 correspond to the first region F1 shown in FIG. 1A, annular zones 3 to 13 correspond to the second region F2, annular zones 14 to 16 correspond to the third region F3, an annular zone 17 corresponds to the fourth region F4, an annular zone 18 corresponds to the fifth region F5, and an annular zone 19 corresponds to the sixth region F6.

In addition, the shape of the lens surface R2 is determined by assigning coefficients shown in FIG. 5B in Formula 3 below.

[Equation 2]

$$Zx = \frac{h2^2}{R2\left[1 + \sqrt{1 - \frac{(1+K2)h2^2}{R2^2}}\right]} + A_2 4 h2^4 + A_2 6 h2^6 +$$

$$A_2 8 h2^8 + A_2 10 h2^{10} + A_2 12 h2^{12} + A_2 14 h2^{14} + A_2 16 h2^{16} \ldots$$

Formula 3

In Formula 3, h2 is the step amount (mm) from the optical axis, and a numerical value of the surface R2 is used for an aspherical coefficient.

Figure 6A:
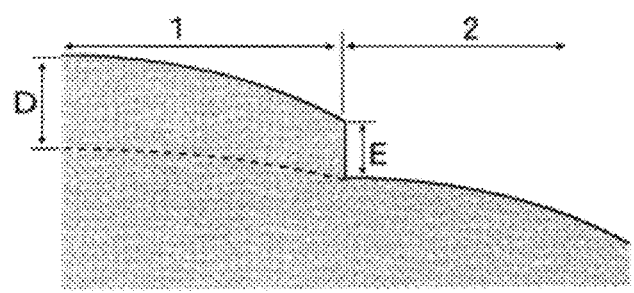
FIG. 6A is a cross-sectional view of an annular zone step provided in a first region F1 and FIG. 6B is a cross-sectional view of an annular zone step provided in a second region F2.

Referring to FIG. 6A, the step amount of each annular zone is calculated with respect to the center of the objective lens in such a way that Formula 1 above holds true, and the surface shape of each annular zone is optimized thereafter. Accordingly, a step amount D of an annular zone step provided between the annular zone 1 and the annular zone 2 is calculated by assigning m=8, wavelength=405 in Formula 1. The value shows a step amount between the center portion of the lens and a virtually extended surface in a case where the surface of the annular zone 2 is virtually extended and thus widened to the center of the lens.

Note that, referring to the table in FIG. 5A, when the annular zone 3 and the annular zone 4 are compared, the annular zone step of the annular zone 3 is the value obtained by assigning m=−2, wavelength=660 in Formula 1, and the annular zone step of the annular zone 4 is the value obtained by assigning m=−3, wavelength=660 in Formula 1. These values are obtained using the center of the objective lens as the reference as described above. Thus, the step amount of the annular zone step provided between these annular zones is a difference between the step amounts obtained by assigning the respective values in Formula 1.

FIG. 5A also shows practical step amounts (E) of annular zone steps. This will be described in detail with reference to FIG. 6.

First of all, with reference to graphs in FIG. 5A, a value (0.0059802 mm) of the annular zone step amount (E) shown in the column of an annular zone 2 is a step amount of an annular zone step between an annular zone 1 and the annular zone 2 as shown in FIG. 6A. As described above, in this embodiment, an annular zone step amount in the traveling direction (downward direction in the drawing) of the laser beam incident on the objective lens 10 is denoted as a positive amount. Thus, when an annular zone step having a positive step amount is formed, as shown in the figure, a portion of the objective lens 10 outside the step is thinner than a portion of the objective lens 10 inside the step.

Figure 6B:
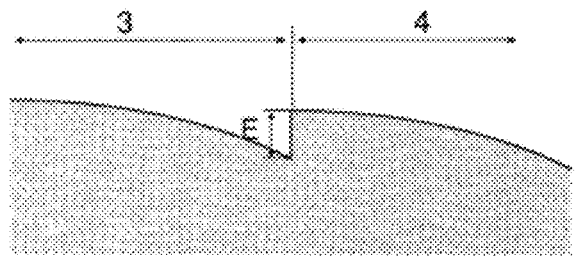

With reference to FIG. 5A, a value (−0.001415622 mm) of the annular zone step amount (E) shown in the column of an annular zone 4 is a step amount of an annular zone step between an annular zone 3 and the annular zone 4 as shown in FIG. 6B. As described above, when an annular zone step having a negative step amount is provided, a portion of the objective lens inside the step is thinner than a portion of the objective lens outside the step.

As described above, the step amount of the annular zone step is calculated with Formula 1 described above. A value of the degree m to be assigned in Formula 1 is determined in consideration of the step amount and the aberration to be caused. This will be described with reference to graphs in FIG. 7. FIG. 7A shows aberrations occurring in the laser beams of the standards when the annular zone step amount is calculated on the basis of the wavelength of the BD standard. FIG. 7B shows aberrations occurring in the laser beams of the standards when the annular zone step amount is calculated on the basis of the wavelength of the DVD standard.

Conditions for calculating the residual aberrations shown in the graphs are described. The wavelength of the BD standard is 405 nm, the wavelength of the DVD standard is 660 nm, the wavelength of the CD standard is 785 nm, the refractive index of the objective lens with the wavelength of the BD standard is 1.558701, the refractive index of the objective lens with the wavelength of the DVD standard is 1.539642, the refractive index of the objective lens with the wavelength of the CD standard is 1.536256, and the step amounts (axial step amount in a case where the annular zone is virtually extended toward the center) for a single wavelength of the BD, DVD, and CD standards are 0.724895 μm, 1.223003 μm, and 1.463853 μm, respectively.

The graphs show the step amounts (D shown in FIG. 6A) on the axis and indicate that a larger step amount (D) on the axis is directly related to a larger practical step amount (E) of the annular zone step.

First of all, the annular zone step amount in the first region F1 (see FIG. 1A) arranged in a center portion of the objective lens is calculated by assigning the wavelength of the laser beam of the BD standard in Formula 1. FIG. 7A shows alternatives of the value of the degree m, axial step amount, and residual aberrations occurring in the laser beams of the standards with annular zone step amounts before and exceeding 7 µm First of all, the first region F1 focuses the laser beams of the BD standard, the DVD standard, and the CD standard. Thus, the residual aberrations occurring in the standards need to be smaller than 0.3λ. With reference to FIG. 7A, the degrees m satisfying this condition is 2, 8, and 10.

When the degree is 10, the annular zone step amount is too large and the moldability in the formation of the objective lens by the injection molding may be degraded. Thus, the degree m of 2 or 8 is appropriate.

Compared with a case where the degree m is 2, the degree m of 8 is more preferable. This is because when the degree m is 8, the residual aberrations occurring in the DVD and the CD standards are of negative values having a sign opposite to that by which the aberrations in the standards are increased. As a result, at the portion provided with the annular zone step, the spherical aberration is corrected to be reduced by the residual aberration. Meanwhile, when the degree m is 2, the residual aberrations in the DVD and the CD standards are of negative and positive values, respectively. Thus, an aberration occurring in the laser beam of the CD standard is difficult to correct.

For the second region F2, which focuses the laser beams of the DVD and the CD standards, the annular zone step amount is calculated on the basis of the wavelength of the DVD standard that is a short wavelength. As a result, aberrations occur in the laser beams of the standards as shown in FIG. 7B. In this embodiment, the degree m for calculating the annular zone step amount in the second region F2 is 1. Thus, the aberration occurring in the laser beam of the CD standard is smaller than 0.3λ (0.16451λ), whereby the laser beam of the CD standard can be focused well in the second region F2. The aberration occurring in the laser beam of the BD standard is equal to or larger than 0.3λ (0.31282λ). Thus, a portion of the laser beam of the BD standard incident on the second region F2 can be prevented from contributing to the spot formation. Accordingly, the optical super resolution can be achieved as described above.

For the third region F3, which focuses the laser beams of the BD and the DVD standards, the annular zone step amount is calculated on the basis of the wavelength of the BD standard. The degree m herein is 3. Thus, with reference to FIG. 7A, an absolute value of the aberration occurring in the laser beam of the DVD standard is smaller than 0.3λ (0.21189λ). Meanwhile, the aberration occurring in the laser beam of the CD standard is equal to or larger than 0.3λ (0.485591λ). Thus, a portion of the laser beam of the CD standard incident on the third region F3 does not contribute to the spot formation. If the portion of the laser beam of the CD standard transmitted through the third region F3 is focused on the information recording layer of the optical disk of the CD standard, the spot diameter may be undesirably small because the numerical aperture of the region is large. In this embodiment, a large aberration is given to the portion of the laser beam of the CD standard transmitted through the third region F3 to avoid this.

As described above, in this embodiment, the value of the residual aberration occurring in the laser beam to be focused is set to be smaller than 0.3λ to improve the accuracy of the reading and writing. This value can be changed and, for example, a value of the residual aberration is more preferably smaller than 0.25λ, and is particularly preferably smaller than 0.20λ. With such values, the accuracy of the reading and writing is further improved.

In the above description, the value of the residual aberration occurring in the laser beam not contributing to the spot formation is set to be equal to or larger than 0.3λ to achieve the optical super resolution. This value can be changed and, for example, a value of the residual aberration is more preferably equal to or larger than 0.35λ, and is particularly preferably equal to or larger than 0.40λ. With such values, the optical super resolution can be more effectively achieved.

Figure 8A:
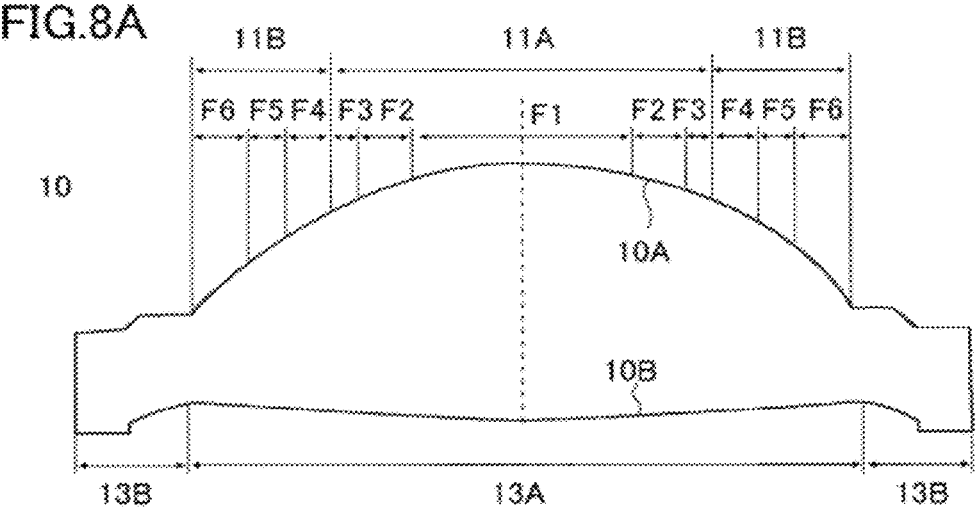
FIG. 8A is a cross-sectional view of the objective lens to be manufactured.
Figure 8B:
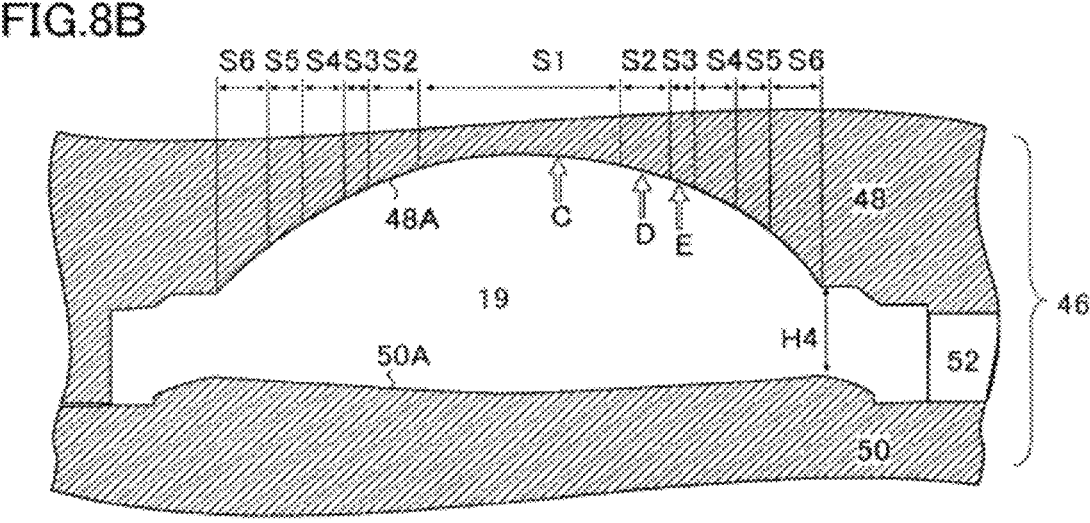
FIG. 8B is a cross-sectional view showing a state of performing injection molding using a mold.
Figure 8C:
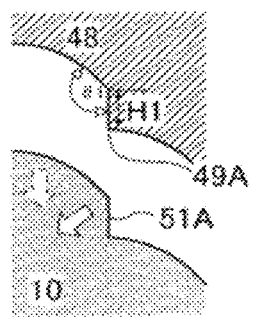
FIGS. 8C to 8E are cross-sectional views of step portions provided in the mold.
Figure 8D:
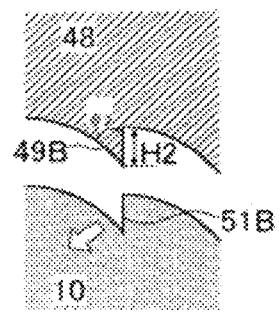
Figure 8E:
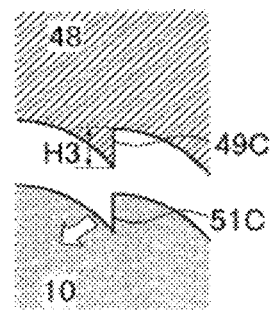

A method for manufacturing the above-described objective lens will be described with reference to FIG. 8. FIG. 8A is a cross-sectional view of the objective lens 10 to be manufactured. FIG. 8B is a cross-sectional view of a mold 46 used in this processing. FIG. 8C to FIG. 8E are partially enlarged cross-sectional views of the mold 46.

With reference to FIG. 8B, in the method for manufacturing the objective lens 10 of a preferred embodiment of the present invention, first, an upper mold 48 and a lower mold 50 forming the mold 46 are brought into contact with each other, so that a cavity 19 is formed therebetween. A resin is injected into the cavity 19 through a gate 52 and then is cured. Then, the upper mold 48 and the lower mold 50 are separated from each other and the objective lens formed of the cured resin is taken out from the mold 46. This processing will be described in detail below.

The upper mold 48 includes an inner wall 48A having a shape conforming to the first lens surface 10A of the objective lens 10 shown in FIG. 8A. The inner wall 48A includes a first region S1 to a sixth region S6 respectively corresponding to the first region F1 to the sixth region F6 of the first lens surface 10A. The shapes of the first region S1 to the sixth region S6 are inverted shapes of the shapes of the first region F1 to the sixth region F6 of the first lens surface 10A. Thus, the first region S1 to the third region S3 of the upper mold 48 include step portions having inverted shapes of the shapes of the annular zone steps provided in the first region F1 to the third region F3 of the objective lens. The upper mold 48 may separately include sections corresponding to the aspherical portion 13A and the flange portion 13B of the objective lens 10 as well as a runner portion through which the resin flows.

The lower mold 50 has an inner wall 50A having a shape conforming to the second lens surface 10B of the objective lens 10. Basically, the second lens surface 10B of the objective lens 10 is provided with no annular zone step. Thus, the inner wall surface 50A of the lower mold 50 has a continuous curved surface shape. The lower mold 50 may include a plurality of sections as in the case of the upper mold 48.

In this processing, first, the upper mold 48 and the lower mold 50 having the above described configurations are brought into contact with each other to form the cavity 19. The cavity 19 has a shape conforming to that of the objective lens 10 shown in FIG. 8A. The mold 46 is also provided with the gate 52 communicated with the cavity 19 and through which the resin is injected. Although not shown, the runner and the like through which liquid resin flows and communicates with the cavity 19 is formed Then, the resin heated into a liquid or semi-solid form is injected into the cavity 19 through the gate 52. The resin material to be injected is polyolefin resin (cyclic olefin copolymer or cycloolefin polymer) as described above. The resin material may also be PMMA resin (acrylic resin), PC resin (polycarbonate), or the like.

After the resin is injected into the cavity 19, the resin is cured and then heat is removed. Then, the upper mold 48 and the lower mold 50 are separated from each other and the objective lens 10 is taken out from the mold 46.

With the processing, the objective lens 10 is manufactured.

In the manufacturing method of this embodiment, the heights of the steps formed in the upper mold 48 are adjusted to facilitate the injection molding using the mold 46. This is described with reference to FIG. 8C to FIG. 8E. FIG. 8C shows a first step portion 49A provided in the first region S1 of the upper mold 48 shown in FIG. 8B. FIG. 8D shows a second step portion 49B provided in the second region S2. FIG. 8E shows a third step portion 49C provided in the third region S3.

With reference to the figures, the first to the third step portions 49A to 49C provided in the upper mold 48 have shapes respectively conforming to the first to the third annular zone steps 51A to 51C respectively provided in the first to the third regions F1 to F3 of the objective lens 10.

For example, with reference to FIG. 8C, the first annular zone step 51A provided in the objective lens 10 has such a shape that a portion of the objective lens 10 outside the first annular zone step 51A is thinner than a portion of the objective lens 10 inside the first annular zone step 51A. The first step portion 49A of the upper mold 48 has an inverted shape of the step shape of the first annular zone step 51A of the objective lens 10. Similarly, as shown in FIG. 8D, the second step portion 49B of the upper mold 48 has an inverted shape of the step shape of the second annular zone step 51B of the objective lens 10. As shown in FIG. 8E, the third step portion 49C of the upper mold 48 has an inverted shape of the step shape of the third annular zone step 51C of the objective lens 10

In this embodiment, the first step portion 49A having the largest step amount (absolute value) is arranged on the innermost side in the upper mold 48. For example, a step amount H1 of the first step portion 49A on the innermost side is 0.0059 mm. A step amount H2 of the second step portion 49B provided outside the first step portion 49A is −0.0014 mm. A step amount H3 of the third step portion 49C provided outside the second step portion 49B is −0.0025 mm. The step amounts of the steps provided in the upper mold 48 are the same as the step amounts of the annular zone steps at the respectively corresponding positions in the objective lens 10.

Thus, there is an advantage that the objective lens 10 molded by the injection molding can be separated well from the upper mold 48. Specifically, when a material injected in the cavity 19 is cured, cure shrinkage is produced in the objective lens formed of the cured resin. Larger cure shrinkage is produced at a portion farther from the center of the objective lens 10. Thus, the annular zone steps of the objective lens fit the step portions of the upper mold to make the objective lens 10 difficult to separate from the upper mold 48.

To improve mold releasability, in this embodiment, the first step portion 49A having the largest step amount is arranged on the innermost side. Thus, the stress due to the cure shrinkage at the first step portion 49A having the large step amount is reduced. Accordingly, the objective lens 10 can be easily separated from the mold.

With reference to FIG. 8C, the stress due to the curing shrinkage described above is partially applied toward the lower side from an upper side in the drawing. In the figure, the direction in which such a stress is applied is shown in a dotted-line arrow. This stress cancels out the stress shown in the solid line described above and facilitates the separation of the objective lens from the mold and is larger at a center portion thicker than a peripheral portion in the objective lens 10. Therefore, the annular zone step having a large step amount to inhibit the separation is disposed in a center portion of the objective lens. Thus, the mold releasability can be secured well.

Furthermore, majority of contraction stress applied toward the center portion is applied downwards (in a direction parallel with the first annular zone step 49A) in the drawing. Thus, the objective lens 10 does not tightly fit to the upper mold 48. In this respect also, the mold releasability of the objective lens 10 is improved by arranging the first annular zone step 49A having a large step amount in a center portion of the objective lens 10.

The objective lens 10 of this embodiment is a three wavelength compatible objective lens that focuses the laser beams of the BD standard, the DVD standard, and the CD standard. The objective lens has a larger NA and thus has a thicker center portion compared with two wavelength compatible lens (for the DVD standard and the CD standard) having the same radius. Thus, the stress represented by the dotted arrow in FIG. 8C is large, and the separation from the mold is notably facilitated.

In this embodiment, the first step portion 49A of the upper mold 48 has a shape not inhibiting the separation. Specifically, an angle $\theta 1$ between the first step portion 49A of the upper mold 48 and an inner wall curved surface portion is an obtuse angle, as shown in FIG. 8C. The cure shrinkage produced when the objective lens 10 is molded acts in a direction toward the center in the objective lens 10. The direction is represented by the arrow in the figure. Thus, although a portion of the inner wall of the upper mold 48 defining the angle adheres to the surface of the objective lens 10, the angle $\theta 1$ at this portion is the obtuse angle and thus the degree of adhesion is small. Thus, the objective lens 10 is separated well.

A portion of the inner wall 48A at which the first step portion 49A is provided has a smaller curvature compared with that at an outer portion and is almost flat. Thus, the objective lens 10 is easily separated from the portion of the inner wall of the upper mold 48 at which the first step portion 49A is provided.

With reference to FIG. 8D, the second step portion 49B of the upper mold 48 has a shape that can easily fit to the second annular zone step 51B of the objective lens 10. This is because an angle $\theta 2$ of a distal end of the second step portion 49B is a sharp angle. A shape of a portion of the inner wall at which the second step portion 49B is provided has a large curvature and thus the objective lens 10 is relatively difficult to separate thereat. However, as described above, the step amount of the second step portion 49B is small compared with that of the first step portion 49A. Thus, an effect of fitting by the cure shrinkage is not so large.

The third step portion 49C shown in FIG. 8E also has a smaller step amount compared with that of the first step portion 49A. Thus, the shape illustrated in the figure does not hinder the separation of the objective lens 10.

In the manufacturing method described above, the objective lens is molded by the injection molding using the resin material. A glass material may be used instead of the resin material. In this case, the glass material of the same volume as the objective lens to be manufactured is prepared. The glass material is heated up to or over the glass-transition temperature and is put into the mold to be pressed. The above described effect can be similarly obtained by applying this embodiment to the manufacturing method using glass molding.

Furthermore, in this embodiment, the optical super resolution described with reference to FIG. 3A and the like is employed and thus, a large distance H4 of 0.274 mm or more is secured between an edge portion of a portion of the inner wall 48A corresponding to the lens surface and an edge portion of a portion of the inner wall 50A corresponding to the lens surface, as shown in FIG. 8B. Accordingly, the resin is injected well into the cavity 19.

The objective lens 10 and the method for manufacturing the same according to this embodiment have been described.

A step amount of the annular zone step and the step portion maybe selected within a certain range. Specifically, to obtain the step amount D in the first region F1, the value of the wavelength (λ) to be assigned in Formula 1 described above does not have to be necessarily 405 nm of the BD standard, and may be changed within a range of 395 nm to 420 nm, for example. If the wavelength used in calculation of the step amount is slightly changed in the manner described above, the aberration occurring in the laser beam of the DVD standard or the CD standard other than the BD standard is improved. The same applies to the second region F2 and the third region F3, and the wavelength used for calculating the step amount is changeable within a range of 645 nm to 675 nm in the case of the DVD standard.

Figure 9:
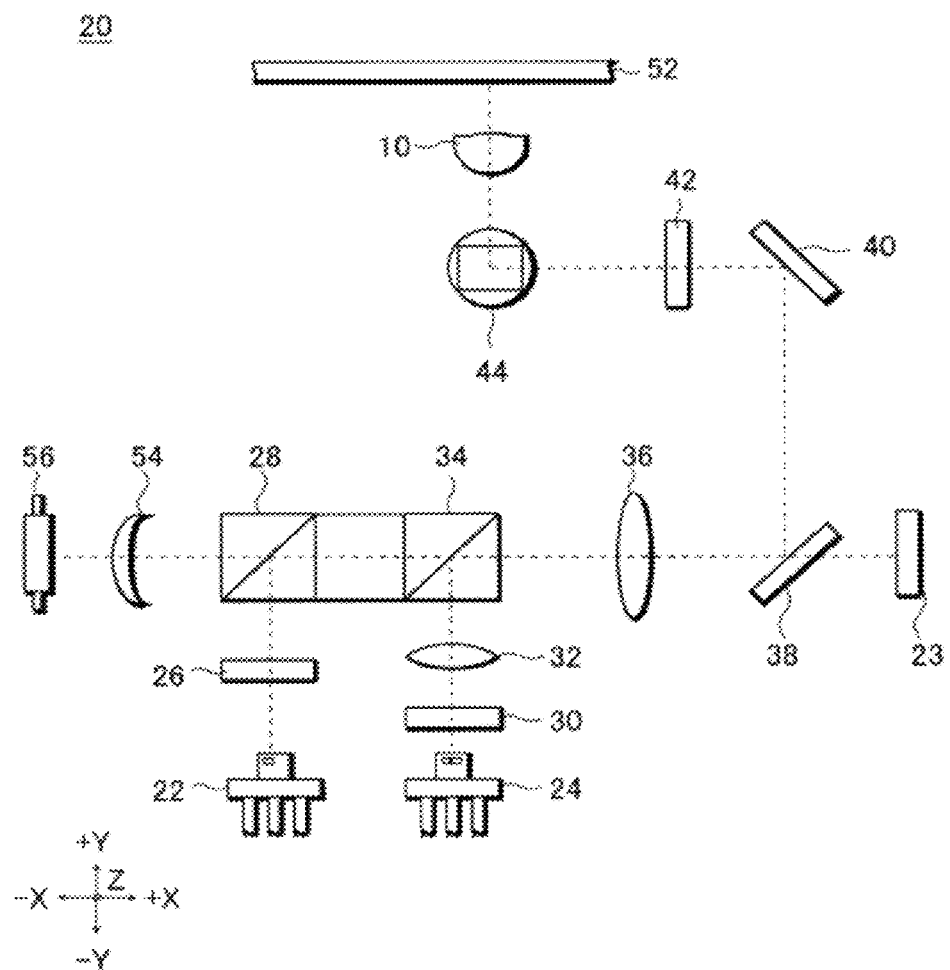
FIG. 9 is a diagram showing an optical pickup apparatus including the objective lens according to the preferred embodiment of the present invention.

Referring to FIG. 9, a description will be given of a configuration of an optical pickup apparatus 20 including the objective lens 10 having the configuration described above. The optical pickup apparatus 20 has a function to focus the laser beam of the BD standard, the DVD standard or the CD standard on an information recording layer of an optical disc 53, then to receive reflected light from the information recording layer and to convert the received light into electric signals. With this function, the optical pickup apparatus 20 performs reading and writing of information from and to the optical disc 53 of each of the standards.

A description will be given of elements included in the optical pickup apparatus 20 of the embodiment.

A laser device 22 emits the laser beam of the wavelength of the BD standard. A laser device 24 emits the laser beams of the wavelengths of the DVD standard and the CD standard.

A diffraction grating 26 is placed between the laser device 22 and a composite prism 28, and the laser beam of the BD standard is made incident on the diffraction grating 26. In addition, the diffraction grating 26 includes: a diffraction grating configured to separate the incident laser beam into 0th order light, +1st order diffracted light, and −1st order diffracted light; and a half-wavelength plate configured to convert the incident laser beam into a beam linearly-polarized in an S direction with respect to a polarization surface of the composite prism 28. Likewise, a diffraction grating 30 is placed between the laser device 24 and a composite prism 34 and includes a diffraction grating and a half-wavelength plate. Note that, the diffraction grating 30 is configured to convert the laser beams of the DVD standard and the CD standard into the beam linearly-polarized in the S direction with respect to a polarization surface of the composite prism 34.

A divergent lens 32 is placed between the diffraction grating 30 and the composite prism 34 and is configured to adjust a spread angle of the laser beam diffracted by the diffraction grating 30.

The composite prism 28 incorporates a polarization surface that has wavelength selectivity and polarization selectivity and thus functions as a polarization splitter for the laser beam of the BD standard and as a total transmission prism for the laser beams of the DVD standard and the CD standard. To put it specifically, the laser beam of the BD standard as the beam linearly-polarized in the S direction is reflected to a +X direction in FIG. 9 by the polarization surface. Meanwhile, the laser beam (returning beam) reflected by the optical disc 53 is a beam linearly-polarized in a P direction and passes through the polarization surface in a −X direction in FIG. 9.

The composite prism 34 incorporates a polarization surface that has wavelength selectivity and polarization selectivity and thus functions as a polarization splitter for the laser beams of the DVD standard and the CD standard and as a total transmission prism for the laser beam of the BD standard. To put it specifically, the composite prism 34 adjusts the reflectivity of the laser beams of the DVD standard and the CD standard and thereby adjusts the light amount of a second laser beams to be guided to a PDIC 56. Then, a large portion of the laser beams of the DVD standard and the CD standard, which are the beams linearly-polarized in the S direction, is reflected to the +X direction in FIG. 9 by the polarization plane. Meanwhile, the laser beams of the DVD standard and the CD standard reflected by the optical disc is the beam linearly-polarized in the P direction and certain percentage thereof pass through the polarization surface in the −X direction in FIG. 9.

A collimating lens 36 converts the laser beams of the BD standard, the DVD standard and the CD standard into infinite light. The collimating lens 36 moves in a direction parallel to an optical path (optical axis) shown by a dotted line (±X direction in the drawing). In addition, the collimating lens 36 optimizes the optical magnification in accordance with the laser beam of each of the standards and thereby suppresses occurrence of interlayer stray light or interlayer crosstalk. In addition, the laser beams can be converted into weak finite light by moving the collimating lens 36.

A reflective mirror 38 has wavelength selectivity and polarization selectivity. To put it specifically, the reflective mirror 38 transmits a part of the laser beam in the outward path to be radiated on an FMD 23.

The FMD 23 receives the laser beam on the outward path that has passed through the reflective mirror 38, and outputs a signal indicating the light amount of the received laser beam. Accordingly, the laser devices 22 and 24 are controlled on the basis of the output of the FMD 23.

A reflective mirror 40 totally reflects the laser beam of each of the standards on the outward path to the −X direction in FIG. 9. Likewise, the reflective mirror 40 totally reflects the laser beam (returning beam) on the returning path, which has been reflected by the optical disc 53, to a −Y direction in FIG. 9.

A quarter-wavelength plate 42 causes a phase difference in the incident laser beam and converts the laser beam of each of the standards as the beam linearly-polarized in the S direction into a circularly-polarized beam. Meanwhile, the laser beam reflected by the optical disc 53 (returning beam) is converted into the laser beam as the beam linearly-polarized in the P direction after passing through the quarter-wavelength plate 42 again.

A reflecting mirror 44 reflects the laser beam of each of the standards to a +Y direction in FIG. 9.

The objective lens 10 focuses the laser beams of the BD standard, the DVD standard and the CD standard that are reflected by the reflecting mirror 44 on an information recording layer of the optical disc 53.

An anamorphic lens 54 is placed between the composite prism 28 and the PDIC 56, and the laser beam (returning beam) of each of the standards, which is reflected by the optical disc 53, passes through the anamorphic lens 54. The anamorphic lens 54 then gives astigmatism for focus servo to the laser beam passing therethrough so as to allow the laser beam of each of the standards to be processed by the single PDIC 56.

The PDIC 56 is a photodetector in which a photodiode integrated circuit element for detecting signals is embedded and receives the laser beam of each of the standards on a light receiving region on a single surface and then outputs a detection signal including an information signal component by photoelectric conversion. Furthermore, the PDIC 56 outputs a detection signal including a servo signal component used in focus servo and tracking servo.

Next, a description will be given of optical paths of the laser beams of the DVD standard and the CD standard.

First, the laser beam emitted from the laser device 24 is made incident on the composite prism 34 after being divided into three beams and converted into the beam linearly-polarized in the S direction by the diffraction grating 30 and being adjusted to have a predetermined spread angle by the divergent lens 32. Thereafter, the laser beam is reflected by the polarization surface of the composite prism 34 and then reflected by the reflective mirror 38 after being converted into infinite light by the collimating lens 36. Moreover, a part of the laser beam passes through the reflective mirror 38 to be radiated on the FMD 23. Thus, the output of the laser device 24 is controlled on the basis of the output of the FMD 23.

The laser beam reflected by the reflection mirror 38 is totally reflected by the reflection mirror 40 and then converted from the beam linearly-polarized in the S direction into a circularly-polarized beam after passing through the quarter-wavelength plate 42. Thereafter, the laser beam as the circularly-polarized beam is reflected by the reflecting mirror 44 and then focused on an information recording layer of the optical disc 53 by the objective lens 10.

Next, the laser beam (returning beam) reflected by the information recording layer of the optical disc 53 passes through the objective lens 10 and are converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, and the composite prisms 34 and 28 after being reflected by the reflective mirrors 40 and 38. Thereafter, astigmatism for focus error detection is given to the laser beam by the anamorphic lens 54. The laser beam is then received by the light receiving region of the PDIC 56 and then converted into a detection signal by photoelectric conversion.

Next, a description will be given of optical paths of the laser beam of the BD standard.

First, the laser beam emitted from the laser device 22 is made incident on the composite prism 28 after being divided into three beams and converted into the beam circularly-polarized in the S direction by the diffraction grating 26. Thereafter, the laser beam is totally reflected by the polarization surface of the composite prism 28 and then totally passes through the composite prism 34. Thereafter, the laser beam is converted into infinite light by the collimating lens 36, and then, a large portion of the laser beam is reflected by the reflection mirror 38, and the remaining portion thereof passes through the reflective mirror 38. The laser beam that has passed through the reflective mirror 38 is detected by the FMD 23. Thus, the output of the laser device 22 is adjusted on the basis of the output of the FMD 23 in the same manner described above.

The laser beam reflected by the reflective mirror 38 is totally reflected by the reflective mirror 40 and then converted from the beam linearly-polarized in the S direction into the circularly-polarized beam after passing through the quarter-wavelength plate 42. Thereafter, the laser beam as the circularly-polarized light is reflected by the reflecting mirror 44 and then focused on the information recording layer of the optical disc 53 by the objective lens 10.

Next, the laser beam (returning light) reflected by the information recording layer of the optical disc 53 passes through the objective lens 10 and is converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, the composite prisms 34 and 28 after being reflected by the reflective mirrors 40 and 38. Thereafter, astigmatism is given to the laser beam by the anamorphic lens 54. The laser beam is then received by the light receiving region of the PDIC 56. Then, a detection signal formed by photoelectric conversion is outputted.

The optical paths of the laser beams of the embodiment have been described above.

In a preferred embodiment of the present invention, multiple shared regions are provided that each focus multiple laser beams having different wavelengths. The step amount of the first annular zone step provided in the first shared region in the center portion is larger than the step amount of the second annular zone step provided in the second shared region arranged further on the outer side. Thus, the amount of shrinkage produced in injection molding using a mold is smaller at the inner portion than the outer portion. Accordingly, stress applied to the first annular zone step having the large step amount is small, and thus, the first annular zone step is prevented from deforming and being damaged.

What is claimed is:

1. An objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising:
a first shared region that is a region arranged in a center portion of the objective lens and configured to focus plural ones of the first laser beam, the second laser beam, and the third laser beam on the information recording layers of corresponding optical discs, the first shared region comprising a first annular zone step; and
a second shared region that is a region arranged outside the first shared region and configured to focus plural ones of the first laser beam, the second laser beam, and the third laser beam on the information recording layers of corresponding optical discs, the second shared region comprising a second annular zone step,
wherein a step amount of the first annular zone step of the first shared region is larger than a step amount of the second annular zone step of the second shared region,
the second shared region is configured to focus the second laser beam and the third laser beam on the information recording layers of the corresponding optical discs, and
the step amount of the second annular zone step is set such that aberrations occurring in the second laser beam and the third laser beam focused by the second shared region are smaller than $0.3\lambda$.

2. The objective lens according to claim 1, wherein the first annular zone step has such a shape that a portion of the objective lens outside the first annular zone step is thinner than a portion of the objective lens inside the first annular zone step.

3. The objective lens according to claim 1, wherein the second annular zone step has such a shape that a portion of the objective lens outside the second annular zone step is thicker than a portion of the objective lens inside the second annular zone step.

4. The objective lens according to claim 1, wherein
the first shared region is configured to focus the first laser beam, the second laser beam, and the third laser beam on the information recording layers of the corresponding optical discs, and
the step amount of the first annular zone step is set such that aberrations occurring in the first laser beam, the second laser beam, and the third laser beam focused by the first shared region are smaller than 0.3λ.

5. An objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising:
a first shared region that is a region arranged in a center portion of the objective lens and configured to focus plural ones of the first laser beam, the second laser beam, and the third laser beam on the information recording layers of corresponding optical discs, the first shared region comprising a first annular zone step; and
a second shared region that is a region arranged outside the first shared region and configured to focus plural ones of the first laser beam, the second laser beam, and the third laser beam on the information recording layers of corresponding optical discs, the second shared region comprising a second annular zone step; and
a third shared region that is an annular zone shaped region arranged outside the second shared region and configured to focus plural ones of the first laser beam, the second laser beam, and the third laser beam on the information recording layers of corresponding optical discs, the third shared region being provided with a third annular zone step,
wherein a step amount of the first annular zone step of the first shared region is larger than a step amount of the second annular zone step of the second shared region, and
the step amount of the first annular zone step of the first shared region is larger than the step amount of the second annular zone step and step amount of the first annular zone step is larger than the step amount of the third annular zone step.

6. The objective lens according to claim 5, wherein
the third shared region is configured to focus the first laser beam and the second laser beam on the information recording layers of the corresponding optical discs, and
the step amount of the third annular zone step is set such that aberrations occurring in the first laser beam and the second laser beam focused by the third shared region are smaller than 0.3λ.

7. An objective lens configured to focus a first laser beam having a first wavelength on an information recording layer of a first optical disc, focus a second laser beam having a second wavelength longer than the first wavelength on an information recording layer of a second optical disc, and focus a third laser beam having a third wavelength longer than the first and second wavelengths on an information recording layer of a third optical disc, the objective lens comprising:
a first shared region that is a region arranged in a center portion of the objective lens and configured to focus plural ones of the first laser beam, the second laser beam, and the third laser beam on the information recording layers of corresponding optical discs, the first shared region comprising a first annular zone step; and
a second shared region that is a region arranged outside the first shared region and configured to focus plural ones of the first laser beam, the second laser beam, and the third laser beam on the information recording layers of corresponding optical discs, the second shared region comprising a second annular zone step; and
a specialized region arranged at a peripheral portion and configured to focus only the first laser beam or the second laser beam on the information recording layer of the corresponding optical disc,
wherein a step amount of the first annular zone step of the first shared region is larger than a step amount of the second annular zone step of the second shared region, and
the specialized region has a continuous curved surface shape.

8. The objective lens according to claim 1, wherein an invalid region configured to prevent the first laser beam or the second laser beam from contributing to spot formation is arranged between the shared regions.

9. An optical pickup apparatus comprising the objective lens according to claim 1.

10. A method for manufacturing an objective lens including a first lens surface and a second lens surface opposite to each other, and including a plurality of annular zone steps provided in the first lens surface, the method comprising:
bringing a first mold including an inner wall having a shape conforming to the first lens surface and a second mold including an inner wall having a shape conforming to the second lens surface into contact with each other to form a cavity;
curing a material of the objective lens in the cavity; and
separating the first mold and the second mold from each other and taking to take out the objective lens,
wherein the inner wall of the first mold includes a plurality of step portions respectively corresponding to the plurality of annular zone steps provided in the first lens surface of the objective lens, and
of the plurality of step portions, one arranged on an inner side in the inner wall of the first mold has a step amount larger than a step amount of one provided on an outer side in the inner wall of the first mold, and
wherein the objective lens is configured to focus a first laser beam, a second laser beam having a wavelength longer than a wavelength of the first laser beam, and a third laser beam having a wavelength longer than the wavelengths of the first laser beam and the second laser beam on information recording layers of corresponding optical discs,
the first lens surface of the objective lens includes:
a first shared region that is a region arranged in a center portion of the objective lens and configured to focus plural ones of the first laser beam, the second laser beam, and the third laser beam on the information recording layers of corresponding optical discs, the first shared region comprising a first annular zone step, and
a second shared region that is an annular zone shaped region arranged around the first shared region and configured to focus plural ones of first laser beam, the second laser beam, and the third laser beam on the information recording layers of corresponding optical discs, the second shared region comprising a second annular zone step having a step amount smaller than a step amount of the first annular zone step, and
a first step portion and a second step portion having shapes respectively conforming to the first annular zone step and the second annular zone step of the objective lens are provided in the inner wall of the first mold, the first lens surface of the objective lens includes a third shared region that is an annular zone shaped region arranged outside the second shared region and configured to focus plural ones of first laser beam, the second laser beam, and the third laser beam on the information recording layers of corresponding optical discs, the third shared region comprising a third annular zone step having a step amount smaller than a step amount of the first annular zone step, and a third step portion having a shape conforming to a shape of the third annular zone step of the objective lens is provided in the inner wall of the first mold.

11. The method for manufacturing an objective lens according to claim 10, wherein the shape of the first step portion is a shape conforming to a shape of the first annular zone step of the objective lens configured in such a manner that a portion of the objective lens outside the first annular zone step is thinner than a portion of the objective lens inside the first annular zone step.

12. The method for manufacturing an objective lens according to claim 10, wherein the shape of the second step portion is a shape conforming to a shape of the second annular zone step of the objective lens configured in such a manner that a portion of the objective lens outside the second annular zone step is thicker than a portion of the objective lens inside the second annular zone step.

13. The method for manufacturing an objective lens according to claim 10, wherein the objective lens is made of a resin, and the resin in a semi-solid or liquid form is injected into the cavity through a gate and then is cured.

\* \* \* \* \*